United States Patent
Weisweiler et al.

(10) Patent No.: US 6,301,879 B1
(45) Date of Patent: Oct. 16, 2001

(54) EXHAUST GAS PURIFICATION SYSTEM FOR DENOXING EXHAUST GASES FROM COMBUSTION UNITS

(75) Inventors: Werner Weisweiler, Remchingen-Singen; Georg Huthwohl, Soest; Bernd Maurer, Balve, all of (DE)

(73) Assignee: HJS Fahrzeugtechnik GmbH & Co., Menden (DE)

( * ) Notice: Subject to any disclaimer, the term of this patent is extended or adjusted under 35 U.S.C. 154(b) by 0 days.

(21) Appl. No.: 09/486,292
(22) PCT Filed: Jun. 19, 1999
(86) PCT No.: PCT/EP99/04268
  § 371 Date: Feb. 22, 2000
  § 102(e) Date: Feb. 22, 2000
(87) PCT Pub. No.: WO99/67512
  PCT Pub. Date: Dec. 29, 1999

(30) Foreign Application Priority Data

Jun. 22, 1998 (DE) .............................. 198 27 678

(51) Int. Cl.[7] ............................................. F01N 3/00
(52) U.S. Cl. ................ 60/274; 60/286; 60/298; 60/303; 60/320; 423/239.1; 423/237
(58) Field of Search ............... 60/274, 286, 303, 60/284, 300, 301, 320, 321, 295, 297, 298; 423/212, 235, 239.1, 237, 238

(56) References Cited

U.S. PATENT DOCUMENTS 5,272,874 * 12/1993 Paas ........................................ 60/297
5,408,827 * 4/1995 Holtermann et al. ................... 60/298
5,584,265   12/1996 Rao et al. .
5,605,042    2/1997 Stutzenberger .
5,809,774 *  9/1998 Peter-hoblyn et al. ................. 60/274
5,809,775 *  9/1998 Tarabulski et al. ..................... 60/274
5,813,224    9/1998 Rao et al. .
6,051,040 *  4/2000 Prter-Hoblyn ....................... 423/358
6,063,350 *  5/2000 Tarabulski et al. ............... 423/239.1

FOREIGN PATENT DOCUMENTS

4200514A1    7/1993  (DE) .
19720209C1   6/1998  (DE) .
0577853A1    5/1992  (EP) .
08057258     3/1996  (JP) .
WO96/08639   3/1996  (WO) .

* cited by examiner

Primary Examiner—Thomas Denion
Assistant Examiner—Binh Tran
(74) Attorney, Agent, or Firm—Flanagan & Flanagan; John R. Flanagan; John K.. Flanagan

(57) ABSTRACT

An exhaust gas purification system for denoxing exhaust gases has a converter containing a substance thermolytically separable into $NH_3$, a feed line connecting the converter with an exhaust gas line for supplying $NH_3$ into the exhaust gas flow therein, a dosing device in the feed line for dosing the $NH_3$ to be introduced into the exhaust gas flow, a heatable cold-start store connected to the feed line between the converter and dosing device for providing the substance during starting of a combustion unit connected to the exhaust gas line, an air feeding device having two air conduits provided with valves wherein one conduit is connected to the feed line between the cold-start store and dosing device and the other conduit is connected to a mixing chamber located in the feed line after the dosing device, and a reservoir container for storing the substance connected to a filling pipe terminating in the converter.

17 Claims, 5 Drawing Sheets

EXHAUST GAS PURIFICATION SYSTEM FOR DENOXING EXHAUST GASES FROM COMBUSTION UNITS

BACKGROUND OF THE INVENTION

The invention relates to the field of reducing primary harmful substances formed in combustion units by means of a catalyst. The invention relates in particular to an exhaust gas purification system for denoxing exhaust gases of combustion units on a heatable and pressure-tight converter comprising an SCR catalyst, in which a substance, thermolytically separating $NH_3$, or a corresponding substance mixture is included or an $NH_3$ store for the intermediate storage of $NH_3$ thermolytically separated from the substance or the substance mixture, a feed line connecting the converter with the exhaust gas for feeding the $NH_3$ into the exhaust flow and a dosing device integrated into the feed line for dosing the $NH_3$ quantity to be introduced into the exhaust flow. The invention further relates to a process for filling a converter of such an exhaust gas purification system with a substance thermolytically separating of an $NH_3$ quantity, namely ammonium carbamate.

Such an exhaust gas purification system is known from DE 197 20 209 C1 of the applicant. With the exhaust purification system described in this document an $NH_3$ supply into the exhaust gas line connected to a combustion unit is possible. For this purpose the exhaust gas purification system uses a heatable pressure-tight converter in which a substance thermolytically separating $NH_3$, for example ammonium carbamate, is contained. By heating the converter, the ammonium carbamate breaks down into the two gases, $NH_3$ and $CO_2$. This gas mixture is introduced into an intermediate store which intermediate store can also be the converter itself. The converter is connected via a feed line to the exhaust gas line, via which the generated $NH_3$ can be mixed into the exhaust flow. The feed line terminates in the exhaust gas line directly in front of an SCR (Selective Catalytic Reduction) catalyst In the feed line a clocked valve is provided as dosing device, with which the $NH_3$ quantity to be introduced into the exhaust gas flow can be dosed. For this purpose, the clocked valve is controlled as a function of the acquired engine characteristics which permit conclusions regarding the $NO_x$ quantity contained in the exhaust gas flow.

The intermediate storage of a small quantity of $NH_3$ can be classified as being harmless, and through the provided after-production it is ensured that there is always the capability of injecting the requisite quantity of $NH_3$ into the exhaust gas flow such that as complete as possible a denoxing can be attained on the succeeding SCR catalyst. Use of a substance thermolytically separating $NH_3$, such as for example ammonium carbamate, has the advantage, compared to handling the $NH_3$ gas, of allowing handling without problems at normal ambient temperatures. Compared to the use of urea, the use of ammonium carbamate has the advantage that thermolytically separating $NH_3$ in the necessary quantity starts already at approximately 60° C. and is largely completed at 80 to 100° C. such that the converter can be heated with a cooling system associated with an internal combustion engine.

In practice, the concept of denoxing realized in the prior known exhaust gas purification system has proven to be useful. The issue is nevertheless improving the known exhaust gas purification system with respect to some points by themselves or also in combination, which improvements relate in particular to the use of the exhaust gas purification system in a motor vehicle, for example, with a Diesel engine:

When using such an exhaust gas purification system in a motor vehicle it must be anticipated that the converter is ruptured in the event of an accident. This does not entail any problems if the converter is cold and under these conditions only the ammonium carbamate used is exuded. With very low vapor pressure a small portion of it will become diluted with the ambient air; the greatest amount can be collected. However, if the converter is in its heated operating state, a specific gas pressure exists in its interior with a corresponding $NH_3$ quantity. One invention is therefore based on the task of providing a converter for an exhaust gas purification system according to the species, whose hazard potential in the event of an accident is decreased.

When starting the engine of a motor vehicle the converter is cold; only with increasing heating of the converter through increasingly hotter cooling water of the combustion engine does the converter become heated to its operating temperature for providing the requisite $NH_3$ quantity as well as the necessary pressure. It therefore takes a specific length of time until the converter is operationally ready to provide the required $NH_3$ quantity. However, it is desired that when starting an engine a sufficient quantity of $NH_3$ is already available for injection into the exhaust gas flow. It is therefore a task of a further invention to develop the exhaust gas purification system further such that even at a cold start of a combustion engine the desired $NH_3$ quantity is available.

The converter of the exhaust gas purification system according to the species is connected via a feed line to the exhaust gas line. The converter is usually disposed at a spacing from the exhaust gas line. It has been found that when using ammonium carbamate as the substance thermolytically separating $NH_3$ on this section the $NH_3$—$CO_2$ gas mixture in the feed line, in particular in the valves disposed therein, can form back again to ammonium carbamate in its solid form. In an unfavorable case, this can lead to an occlusion of the feed line. It is therefore a task of a further invention to provide an exhaust gas purification system according to the species, in whose feed line the crystallization of the substance thermolytically separating $NH_3$ out of the gaseous phase carried in the feed line is prevented.

If the substance thermolytically separating $NH_3$ in the converter, for example, ammonium carbamate is completely or substantially completely gasified, no more $NH_3$ or no sufficient amount of $NH_3$ can be produced. For this purpose it is provided to remove the converter from the system and to exchange it against a filled on. However, this entails the disadvantage that in this case corresponding connections in the feed line must be provided. The exchangeability further has a disadvantageous effect on the heating due to, for example, a heating coil encompassing the converter, since the heat transfer path in this case is relatively long and is discontinuous due to the gap between the converter and the heat coil. Further, it will be considered to dispose the converter in a motor vehicle at such a location that it is not destroyed in the event of an accident. In this case, the accessibility to the converter is occasionally not without problems. A further invention is therefore based on the task of providing an exhaust gas purification system according to the species in which a converter exchange, in order to make available fresh substance thermolytically separating $NH_3$, is not necessary. Accordingly, this invention is also based on the task of providing such a filling process.

SUMMARY OF THE INVENTION

The hazard potential emanating from a converter in its operating state is reduced by providing "quenching" water in which the $NH_3$ is readily soluble. It can therein be provided, for example, that the converter is encompassed by a foamed material jacket filled with water or that a heating coil, connected to the cooling water circulation of a combustion engine and provided for heating the converter, comprises at a predetermined site a breaking point. If the converter is ruptured, the $NH_3$ flowing out in the first case is bound in the water jacket, while, in the second case, it is dissolved with the cooling water which likewise flows out.

In order to make the prior known exhaust gas purification system capable for cold starting, it is provided that with the feed line a heatable cold-start store is associated, in which a small quantity of the substance thermolytically separating $NH_3$, for example, ammonium carbamate is contained. The cold-start store can be heated with a resistance heating unit or also with exhaust gas to a relatively which temperature such that in a very short time the ammonium carbamate quantity in the cold-start store is gasified. Since in the cold state of the SCR catalyst in any event only an incomplete denoxing can be carried out, only a small quantity of $NH_3$ needs to be made available during the starting process. The cold-start store can be dimensioned correspondingly. For this purpose, the cold-start store is disposed with its open end terminating in the feed line, in the direction of flow, before the clocked valve. The cold-start store can be filled with activated charcoal or with another material having a large surface area. The cold-start store is provided, with respect to the feed line, in a position which, with respect to the operating temperature of the feed line, is relatively cool. During operation of the exhaust gas purification system, in which from the converter, when using ammonium carbamate, $NH_3$ and $CO_2$ flow through the feed line, it is formed back into ammonium carbamate upon entering into the cold-start store. Consequently, the cold-start store is filled when the engine is cold-started again.

In order to prevent that from the cas mixture provided in the converter the substance thermolytically separating $NH_3$ can be formed back into the starting substance in the feed line, it can be provided that into the feed line compressed air is blown in with an air feeding device. Thereby a certain dilution of the gas mixture provided or of the $NH_3$ quantity provided takes place, which dilution is however regulatable. When using ammonium carbamate as the substance thermolytically separating $NH_3$, an air dilution of up to approximately 100% can take place in the feed line without losses having to be accepted with respect to the functional capability of the exhaust gas purification system. The air feeding device comprises a compressed air source which can be, for example, the compressor of a truck or a turbo charger, as well as air conduits provided with valves and terminating in the feed line. It can therein be provided that the air feeding device comprises two air conduits with a first terminating in the feed line, in the direction of flow, behind the clocked valve and a second, in the direction of flow, before the clocked valve and thus immediately in the region of the output of the converter. The second air conduit is secured through a check valve against the penetration of the useful gas or the mixture of useful gas. In the first air conduit a valve is disposed for regulating the quantity of air to be injected. The first air conduit terminates usefully in a mixing chamber succeeding the clocked valves, in which a sufficient turbulence, and thus concomitant mixing with the $NH_3$ gas mixture, takes place. For such a case is provided to heat the clocked valve as well as the further valves disposed in the feed line, for example a magnet valve at the output of the converter and a pressure-reducer valve, as well as the line itself in order to prevent the useful gas mixture from forming back into its starting substance. These cited components can be disposed in one subject unit such that the heating expenditures are reduced to a minimum and it is made available in a useful embodiment example to provide this subject unit with a resistance heating unit as well as also with ports such that this subject unit can be connected to the cooling water circulation and can be heated by it. The resistance heating unit serves only for heating this module during the start of the engine. The second air conduit serves for "flushing" the feed line before an engine start or also for "flushing" between individual dosing phases in order to remove residues of the substance thermolytically separating $NH_3$ which might be present.

In addition, the possibility exists of heating the entire feed line in order to prevent the formation of the $NH_3$ gas mixture back into its starting substance.

To renew the substance or substance mixture thermolytically separating $NH_3$ in the converter, the invention provides that it be implemented so as to be fillable. Such a converter can be fillable in different ways, for example by means of filling with gas or by means of filling with a solid material. Conceivable is also the filling of the converter in liquid or gel-like form, in which solvents the $NH_3$ thermolytically separating substance is contained. The exhaust gas purification system in this case is also laid out for handling the solvents.

In the case of filling the converter with gas, the units present, converter and heating or cooling water coils, are utilized with precisely reversed functions with respect to the exhaust gas purification system. Additional units are therefore not required. The converter comprises for this purpose two filling conduits, with one provided for supplying $NH_3$ and a second for supplying $CO_2$. The supplying-side of the filling conduits are implemented such that they can be connected to a tank containing the particular gas. Here for example correspondingly adapted couplings, such as are known from gas filling installations for motor vehicles, can be employed. The heating coil provided during operation of the exhaust gas purification system now serves for cooling the converter such that the inflowing gases can be formed back into ammonium carbamate in the converter. Cooling is also desired for the reason that the reaction between the gases $NH_3$ and $CO_2$ is an exothermic reaction so that for accelerating the ammonium carbamate formation this reaction heat must be dissipated additionally. The cooling effect, and conversely also the heating of the converter, can be enhanced by using finned tubes. The desired $NH_3$:$CO_2$ ratio in the converter for forming the ammonium carbamate is usefully approximately 2.5:1, and this ratio can be adjusted via the particular pressure of the introduced gas. So that the charging of the converter through a gas filling can take place in an acceptable period of time, it is useful that the converter is cooled so far that it has a maximum temperature of 30 to 33° C. The desired reaction proceeds at a correspondingly slower rate at higher temperatures. To illustrate these relationships, reference is made to FIG. 1a and FIG. 1b, in which the course is shown of the reaction after mixing $NH_3$ and $CO_2$ at a temperature variation or by varying the ratio of $NH_3$:$CO_2$ during discontinuous operation.

For a fueling time the conclusion can be drawn on the basis of the experiments performed that at a temperature of 33° C., a ratio of $NH_3$:$CO_2$ of 2:1, and an initial reaction rate $dp/dt=0.15$ bar/s, for the formation of one mole of ammonium carbamate (78 gram) a reaction time of approximately 30 seconds is required. By extrapolating this result, a fueling time for 1 kg ammonium carbamate of approximately 6.5 minutes results. When using the exhaust gas purification system in a truck, the converter used can thus also be filled again in the time normally provided for fueling.

To simplify a converter cooling mechanism for fueling at heated cooling water, it is provided in an implementation that the exhaust gas purification system comprises two converters connected as a duplex system. The exhaust gas purification system can in this case be controlled such that always only one converter is heated by the warm cooling water so that the other converter is correspondingly cold in order to be filled by a gas filling.

In the case of filling in solid form of the converter with a substance or substance mixture thermolytically separating $NH_3$, it is provided that the converter comprises a pipe connection whose free end is connected to a dosing device. The input of the dosing device, for example a bucket wheel, is connected to the output of a reservoir container. The bucket wheel can be isolated at the input side and the output side through a valve each. It can be provided that the reservoir container is fixedly associated with the exhaust gas purification system and has a closable filling opening. However, it can also be provided that the reservoir container itself is an exchangeable container or a disposable container, in which, for example, ammonium carbamate as the substance thermolytically separated $NH_3$ is contained in the form of, if appropriate, coated pellets. Such a reservoir container is connected to the input of the dosing device, subsequently opened, such that the pellets can be supplied to the bucket wheel and subsequently the converter. This type of filling can also be implemented as filling of the converter where via the bucket wheel the entire content of the reservoir container is introduced into the converter. However, it is also possible to provide that the converter is charged continuously with, for example, ammonium carbamate pellets such that the quantity of ammonium carbamate in the converter is kept constant. The quantity of ammonium carbamate in the converter in this case only needs to be relatively small since new nonconsumed ammonium carbamate can be filled continuously or at intervals via the bucket wheel into the converter. Due to the lesser quantity of ammonium carbamate in the heated converter, the hazard potential emanating from the converter in the event of an accident is in this case also reduced.

The described inventive solutions relate in each instance to individual aspects of further developments of the exhaust gas purification system prior known from DE 197 20 209 C1, whose content herewith through explicit reference is also made the content of these implementations. The disadvantages indicated with respect to prior art are also solved in combination through the exhaust gas purification system claimed in the independent claim 23.

The invention is not limited to providing an exhaust gas purification system in which is used exclusively substances or substance mixtures only thermolytically separating $NH_3$ thermolytically but also includes such systems in which substances are used which for giving off $NH_3$ are broken down in two steps, where in a first step a thermolytic and in a second step, for example, a hydrolytic decomposition is carried out.

BRIEF DESCRIPTION OF THE DRAWINGS

Further advantages and further developments are evident in the succeeding description of preferred embodiment examples with reference to the Figures. Therein depict.

DETAILED DESCRIPTION OF THE INVENTION

Figure 1A:
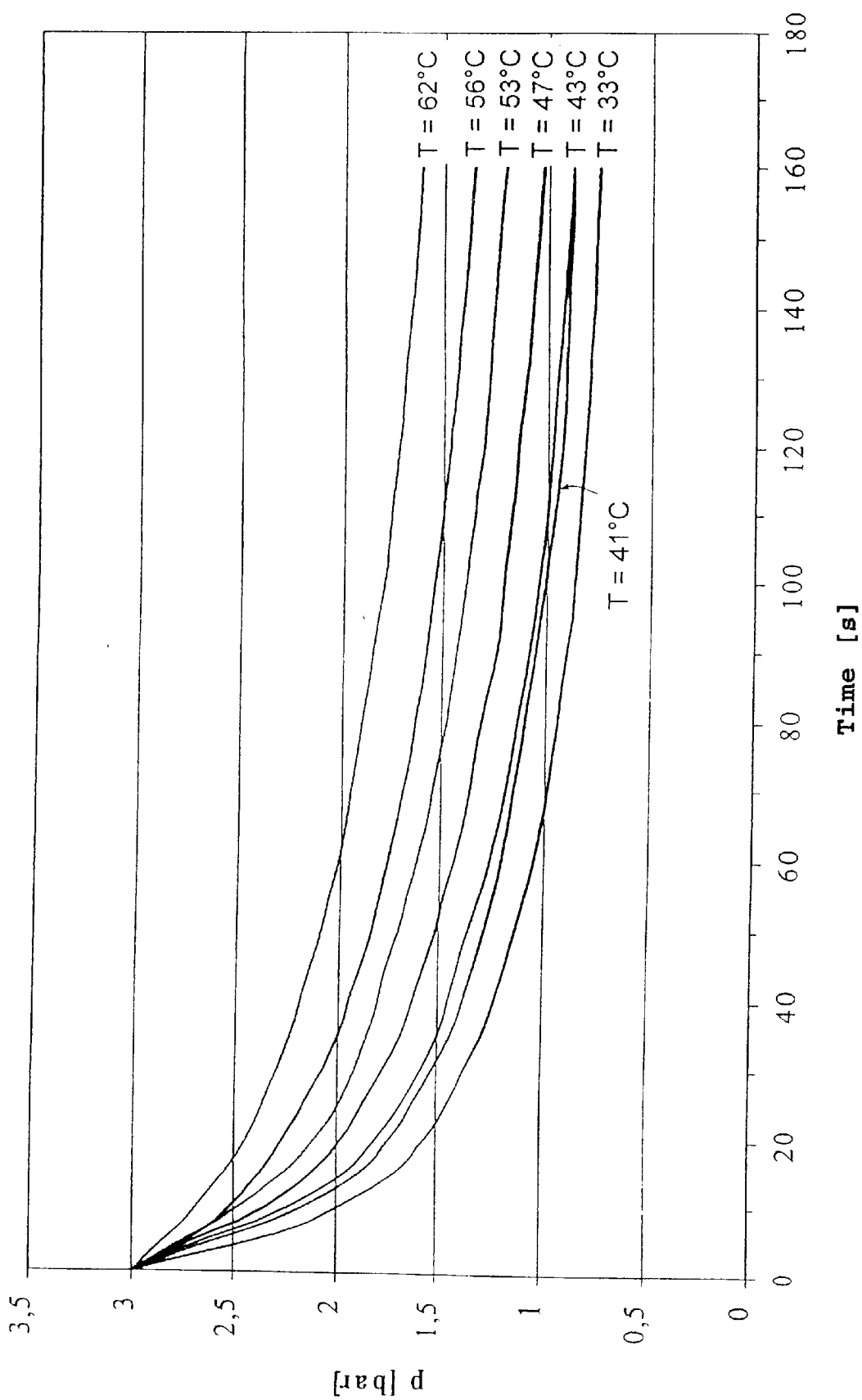
FIG. 1a a diagram that represents, over the indicated temperature variation, the course of the reaction that forms ammonium carbamate from mixing $NH_3$ and $CO_2$.
Figure 1B:
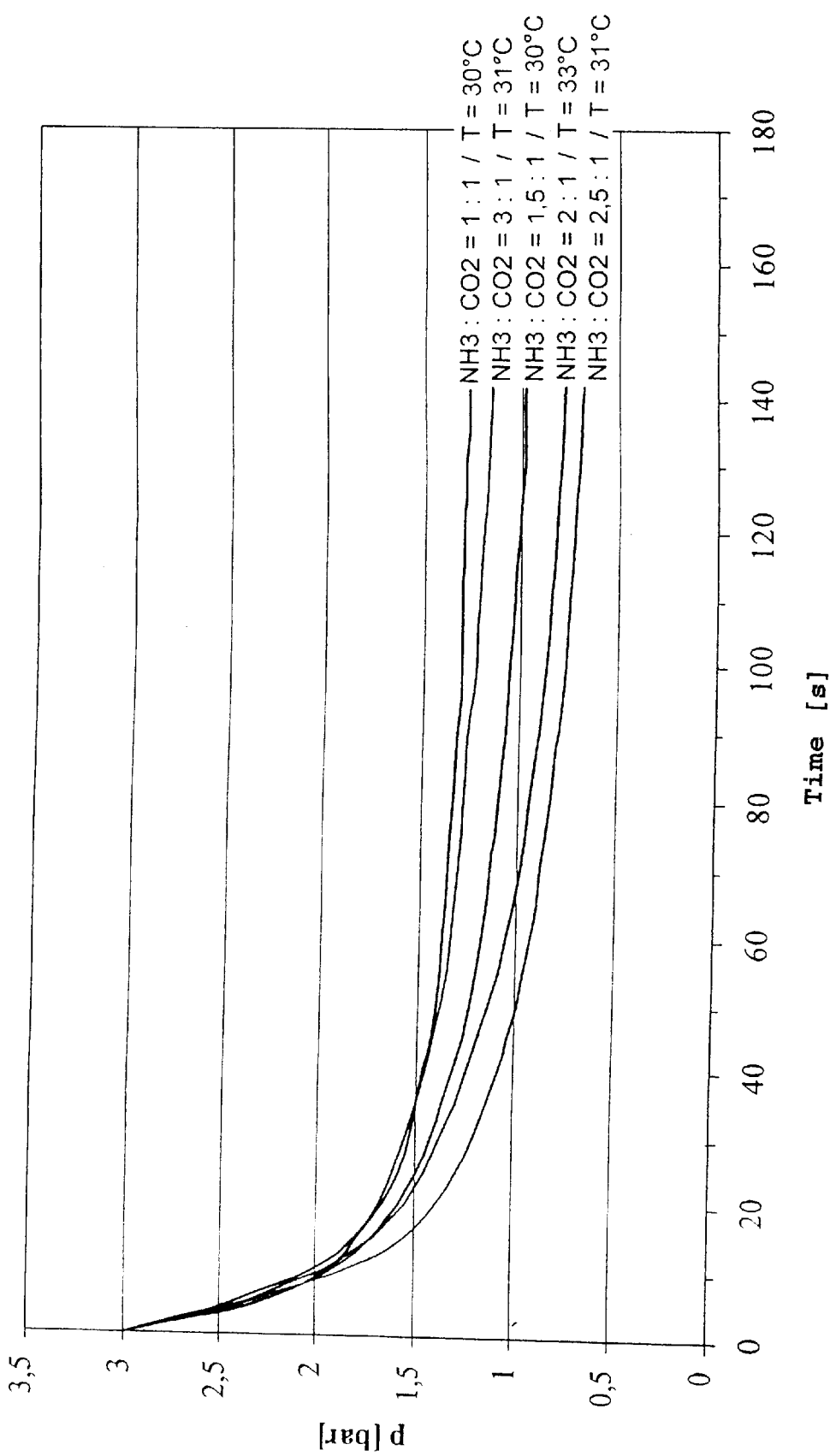
FIG. 1b a diagram that represents, over the indicated ratios of $NH_3:CO_2$, the course of the reaction that forms ammonium carbamate from mixing $NH_3$ and $CO_2$ FIG. 2 in a schematic representation an exhaust gas purification system for denoxing exhaust gases of a combustion engine on an SCR catalyst, FIG. 3 in a basic representation a converter configuration structured as a duplex system, and FIG. 4 a further converter for an exhaust gas purification system of FIG. 1 with a solid substance filling device.
Figure 2:
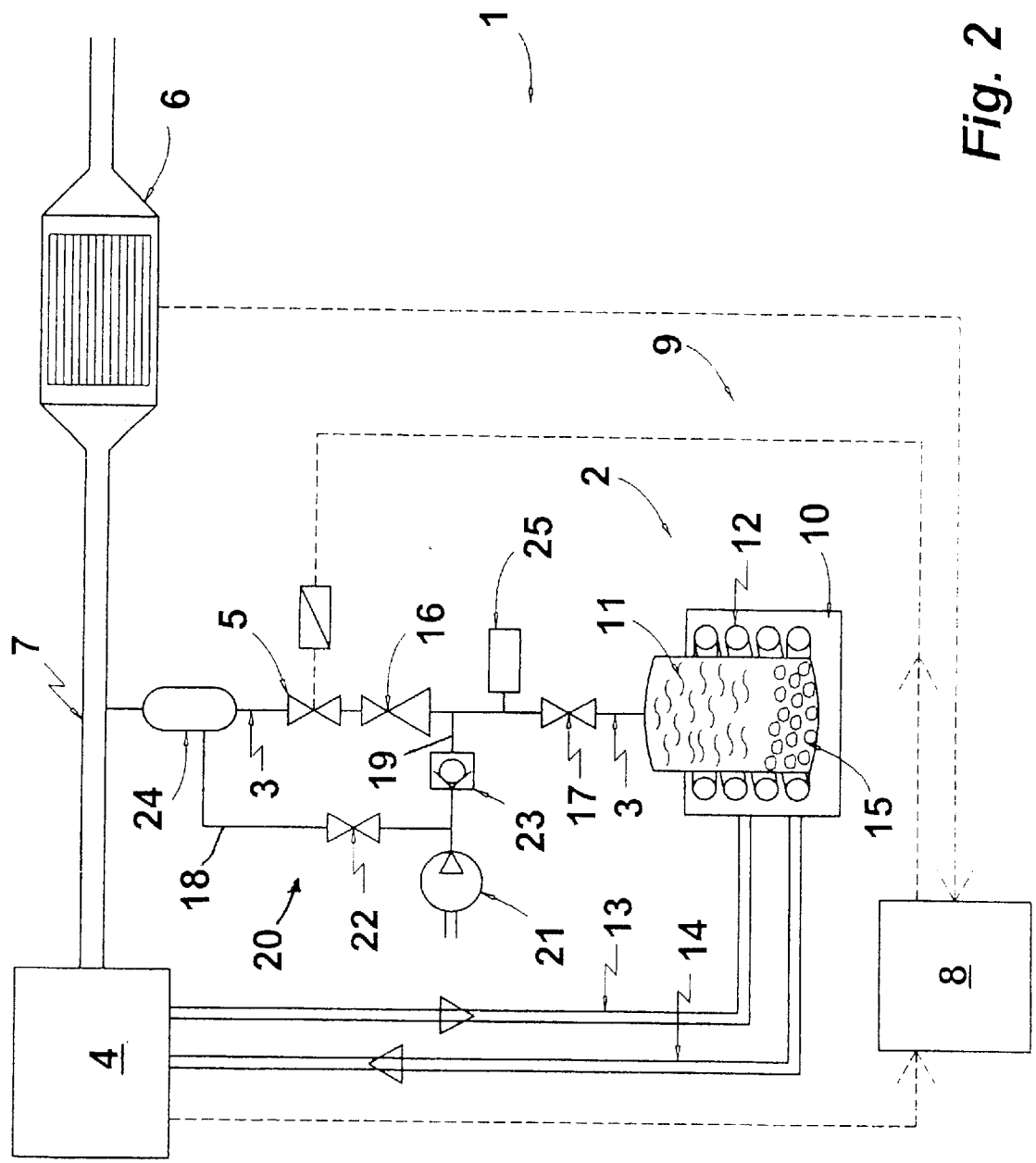

The exhaust gas purification system 1 depicted schematically in FIG. 2 comprises a converter 2, a feed line 3 for supplying $NH_3$ into the exhaust gas flow of a Diesel engine 4, and a clocked valve 5 provided as dosing device as well as an SCR catalyst 6. The feed conduit 3 terminates in the exhaust gas line 7 of the Diesel engine 4 in front of the input side of the catalyst 6.

For the control of the clocked valve 5 there is provided a memory-programmable control unit 8 which is acted upon by signals from sensors acquiring engine operating characteristics as well as signals of a sensor acquiring the catalyst temperature. The control unit 8 is connected at the output side via a control line 9 with the clocked valve 5 such that the clocked valve 5 is controlled by the control unit 8 for dosing the $NH_3$ quantity to be added to the exhaust gas flow.

The converter 2 comprises a heating unit 10 as well as a reaction vessel 11. The heating unit 10 comprises a heating coil 12 which, via an inlet conduit 13 and a drain conduit 14 is integrated into the cooling water circulation of the Diesel engine 4. A thermostat valve is connected into the inlet conduit for limiting the temperature. As a rule, the cooling water flowing through the heating coil 12 during the operation of the Diesel engine 4 has temperature between 80 and 100° C. which can potentially also increase to 110° C. For the rapid heating of the heating unit 10 or of the reaction vessel 11 received therein, the inlet and drain conduits 13, 14 are integrated into the so-called small cooling water circulation of the Diesel engine 4.

The reaction vessel 11 is a pressure-tight container into which a predetermined quantity of ammonium carbamate 15 is introduced. The reaction vessel 11 is closed pressure-tight.

By heating the ammonium carbamate 15 as a consequence of the flow through the heating unit 10 of, as a rule, cooling water of 80 to 100° C., the ammonium carbamate 15 is broken down into $NH_3$ and $CO_2$ and a nearly complete decomposition of the ammonium carbamate 15 for forming the $NH_3$-containing reduction gas mixture takes place. The gases generated in the reaction vessel 11, namely $NH_3$ and $CO_2$, remain initially in the reaction vessel 11 which serves simultaneously as an intermediate store.

With increasing decomposition of the ammonium carbamate 15, by maintaining the thermolytically separating temperature in the reaction vessel 11 the internal pressure increases in it up to approximately 8 bar at a temperature of approximately 100° C. As a function of the internal temperature of the reduction vessel an equilibrium state is established upon said internal pressure being reached, such that no further ammonium carbamate 15 is broken down. Consequently, the reaction vessel 11 also forms simultaneously an $NH_3$ store from which the $NH_3$-containing gas mixture can be drawn off. Removing a specific quantity of gas simultaneously leads to a reduction of the internal pressure in the reaction vessel 11 such that the decomposition of further ammonium carbamate 15 with the splitting off of $NH_3$ is the result. Additional ammonium carbamate 15 continues to be decomposed until said equilibrium state has been reestablished again. By utilizing the state of equilibrium which is becoming established in the reaction vessel 11, a means is created for stopping the $NH_3$ production after a specific quantity of $NH_3$ has been reached without requiring additional control mechanisms. Accordingly, the quantity of $NH_3$ in the converter 2 does not exceed a specific measure.

The thermolytically separating $NH_3$ is removed from the reaction vessel 11 via a pressure reducer valve 16 and supplied via the feed line 3 to the clocked valve 5.

At the output of converter 2 in the feed line 3 the pressure reducer valve 16 is preceded by a magnet valve 17 for controlling the removal of a quantity of $NH_3$ gas mixture. In the feed line 3 terminate two air conduits 18, 19 of an air feeding device 20, which is acted upon with compressed air by a compressor 21. In the air conduit 18 is disposed a magnet valve 22 and in the air conduit 19 is disposed a check valve 23. The air conduit 18 terminates, in the direction of the $NH_3$ flow, after the clocked valve 5 in a mixing chamber 24, which is a portion of the feed line 3. The air conduit 19 terminates, in the direction of flow, before the pressure reducer valve 16 in the feed line 3. With the aid of the air feeding device 20 it is possible to blow through the feed line 3 via the air conduit 19 before the start of the engine 4 for the purpose of cleaning it, and through the pressure reducer valve 16, the clocked valve 5 and the mixing chamber 24 air flows and thus cleanse them. Via the air conduit 18 a feeding of compressed air into the mixing chamber 24 of the feed line 3 takes place such that on the path between the mixing chamber 24 and the exhaust gas line 7 through the occurring gas dilution it is largely prevented that ammonium carbamate separates out of the $NH_3$—$CO_2$ gas mixture.

To prevent the ammonium carbamate separation in the feed line section, comprising the magnet valve 17, the pressure reducer valve 16, and the clocked valve 5, a heating device, not shown in FIG. 2, is associated with this section of the feed line 3.

To the feed line 3 is further connected a cold-start store 25. The cold-start store 25 is filled with activated charcoal for absorbing ammonium carbamate. The container of the cold-start store 25 is disposed outside of the heated sections of the feed line 3. The cold-start store 25 has at its disposal a separate resistance heating device, not depicted further, with which the cold-start store 25 can be heated in a short time to temperatures of approximately 150 to 200° C. This heating is actuated only during the engine start and only for such length of time until the converter 2 is heated by the warming-up cooling water so far that the ammonium carbamate 15 in the converter 2 thermolytically separating $NH_3$ and a sufficient pressure is generated. After consumption of the first $NH_3$ gas mixture when starting the engine 4 by heating the cold-start store 25, it serves during the later operation of the exhaust gas purification system 1 as a cooling trap in which from the gas mixture of $NH_3$ and $CO_2$, flowing through the feed line 3, ammonium carbamate is separated out for the next cold start.

Figure 3:
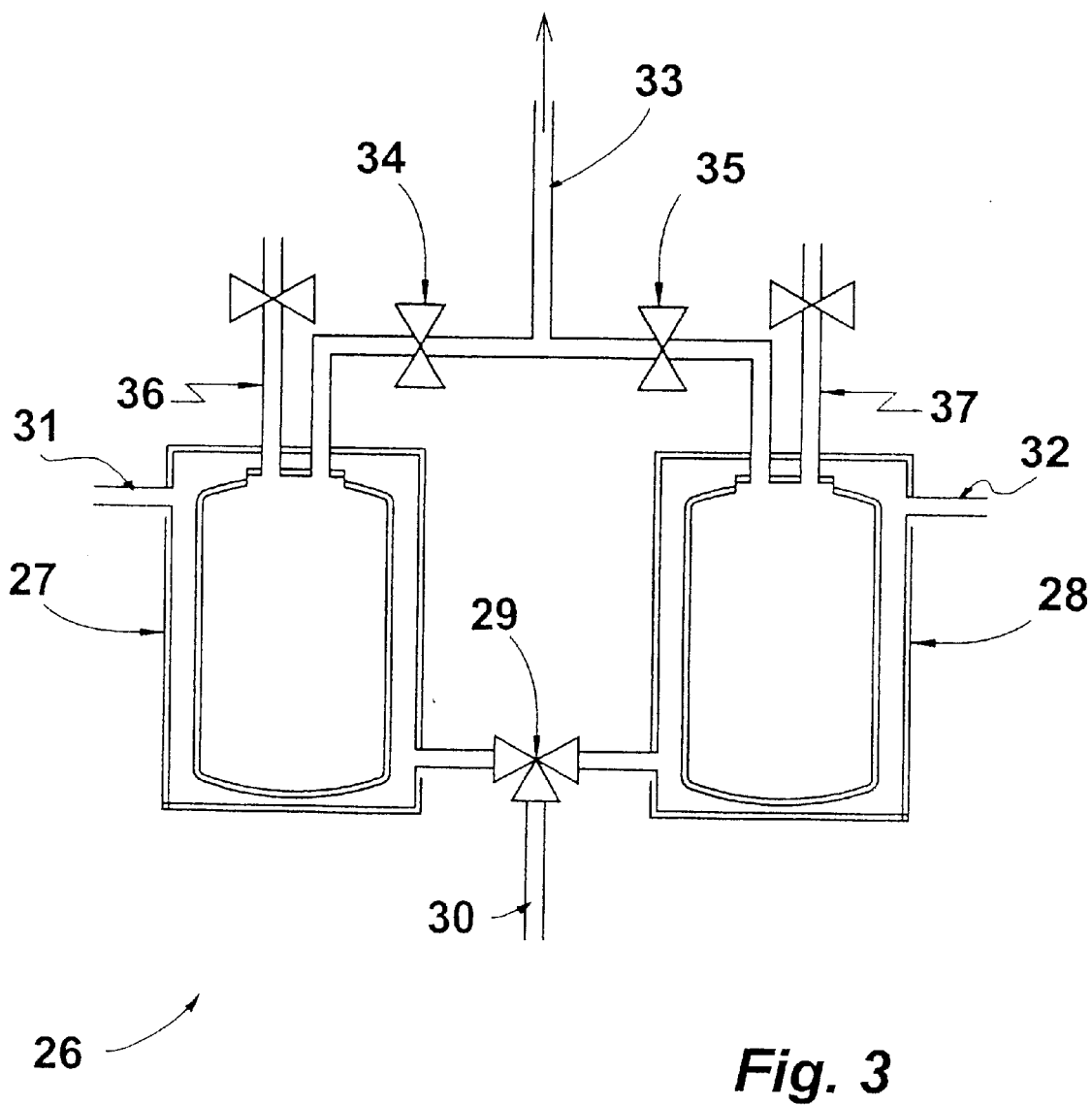

FIG. 3 shows a converter system 26 comprising two individual converters 27, 28 which for the production of the $NH_3$ gas mixture can alternately be connected to the cooling water circulation of an internal combustion engine. Both converters 27, 28 are connected via a three-way selector valve 29 to a cooling water inlet conduit 30. The two cooling water drain conduits 31, 32 carry the cooling water back into the motor vehicle-side cooling water circulation. At the output side the two converters 27, 28 are connected to the feed line 33 terminating in the exhaust gas line, and it is provided that before a confluence of the two pipe connections into the common feed line 33, each pipe connection can be isolated by a magnet valve 34, 35.

Into each converter 27, 28 terminates a two-channel filling conduit 36, 37 for filling the two converters 27, 28 with the two gases $NH_3$ or $CO_2$, such that from the gas mixture forming in the converters 27, 28 ammonium carbamate can separate out.

Such a duplex converter system as part of an exhaust gas purification system is in particular useful if the fueling times for the converter 27, 28 are to be kept as short as possible. In this case it is possible to drive with a "cold" converter to a fueling installation. Further, a gas fueling of the converters 27, 28 or also of the converter 2 has the advantage that the converter(s) can be disposed at a site within a motor vehicle which is safe in the event of an accident and which for this reason is only accessible with difficulty from the outside. In this case only the free ends of the filling conduits 36, 37 need to be moved to an accessible position.

Figure 4:
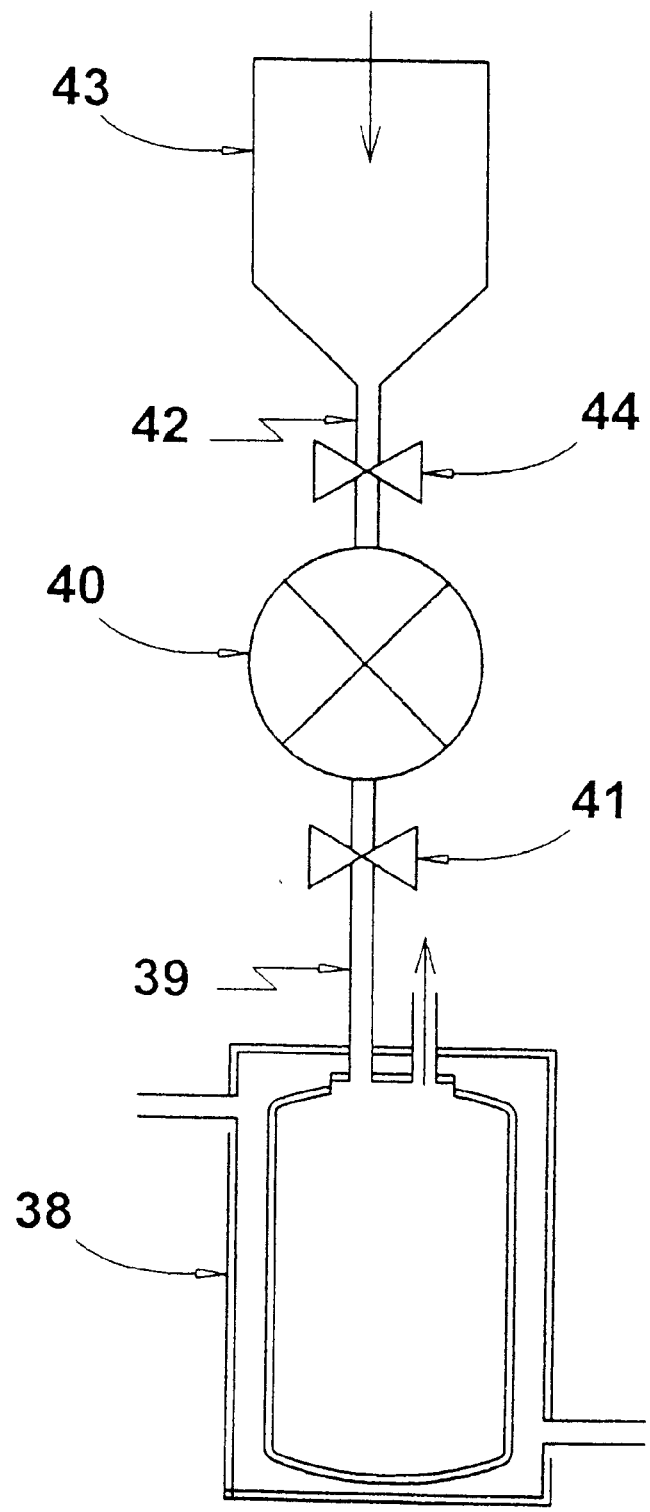

FIG. 4 shows a further converter 38 which is connected for the purpose of being filled with a filling pipe-fitting 39 to a bucket wheel 40. The bucket wheel 40 can be isolated at the output side by a magnet valve 41. At the input side the bucket wheel 40 is connected to a further filling pipe-fitting 42 at whose free end a reservoir container 43 is disposed. The bucket wheel 40 can be isolated at the input side through a further magnet valve 44. In the reservoir container 43 ammonium carbamate pellets, not further shown, are contained. The pellets themselves are coated to improve their handlability. Nevertheless, this coating is such that through the vapor pressure of the ammonium carbamate slight decomposition starts already in the reservoir container 43. The individual pellets in this case do not show a tendency to stick together since they are encompassed by an envelope of the gas mixture formed through the decomposition, which also supports their transport into the bucket wheel 40 and subsequently into the converter 38. Via the magnet valves 44 and 41 the pellets are initially supplied to the bucket wheel 40 and subsequently to the converter 38 for the purpose of filling it. This filling can be carried out continuously such that in the converter 38 a specific quantity of ammonium carbamate is always present.

COMPILATION OF REFERENCE SYMBOLS

1 Exhaust gas purification system
2 Converter
3 Feed line
4 Diesel engine
5 Clocked valve
6 SCR catalyst
7 Exhaust gas line
8 Control unit
9 Control line
10 Heating unit
11 Reaction vessel
12 Heating coil
13 Cooling water inlet conduit
14 Cooling water drain conduit
15 Ammonium carbamate
16 Pressure reducer valve
17 Magnet valve
18 Air conduit 19 Air conduit
20 Air feeding device
21 Compressor
22 Magnet valve
23 Check valve
24 Mixing chamber
25 Cold-start store
26 Converter system
27 Converter
28 Converter
29 Three-way selector valve
30 Cooling water inlet conduit
31 Cooling water drain conduit
32 Cooling water drain conduit
33 Feed line
34 Magnet valve
35 Magnet valve
36 Filling conduit
37 Filling conduit
38 Converter
39 Filling pipe-fitting
40 Bucket wheel
41 Magnet valve
42 Filling pipe-fitting
43 Reservoir container
44 Magnet valve

What is claimed is:

1. Exhaust gas purification system for denoxing exhaust gases of combustion units on an SCR catalyst comprising a heatable pressure-tight converter in which a substance or a corresponding substance mixture, thermolytically separating $NH_3$, is contained, an $NH_3$ store for the intermediate storage of $NH_3$ thermolytically separated from the substance or the substance mixture, a feed line connecting the converter with the exhaust gas line for supplying $NH_3$ into the exhaust gas flow, and a dosing device integrated into the feed line, for dosing the quantity of $NH_3$ to be introduced into the exhaust gas flow, characterized in that the converter is encompassed by an $H_2O$ jacket, which $H_2O$ jacket is formed by a foamed material filled with $H_2O$.

2. Exhaust gas purification system for denoxing exhaust gases of a combustion unit on an SCR catalyst comprising a heatable pressure-tight converter containing a substance or a corresponding substance mixture thermolytically separating $NH_3$, an $NH_3$ store for the intermediate storage of $NH_3$ thermolytically separated from the substance or the substance mixture, a feed line connecting the converter with an exhaust gas line for supplying the $NH_3$ into an exhaust gas flow therein, and a dosing device integrated into the feed line for dosing the quantity of $NH_3$ to be introduced into the exhaust gas flow, characterized in that a cold-start store is connected to the feed line between the converter and dosing device which during normal operation of the system captures and contains a quantity of the substance or substance mixture and during start of the combustion unit delivers a certain quantity of the substance or the substance mixture to the feed line, and a heating device is associated with the cold-start store and operable to heat the substance or the substance mixture in the cold-start store for thermolytically separating $NH_3$ for delivery to the feed line.

3. The system as claimed in claim 2, characterized in that the cold-start store is filled with a means for absorbing the $NH_3$ or the substance mixture thermolytically separating $NH_3$.

4. The system as claimed in claim 2, characterized in that a second dosing device is provided, a filling pipe-fitting terminates into the converter and is connected to an output of the second dosing device and a reservoir container is provided for storing the substance or substance mixture thermolytically separating $NH_3$ having an output side that acts upon the dosing device.

5. The system as claimed in claim 4, characterized in that the substance or the substance mixture contained in the reservoir container is in the form of coated pellets.

6. The system as claimed in claim 4, characterized in that the second dosing device is in the form of a bucket wheel and a first isolation valve is disposed between the bucket wheel and the reservoir container and a second isolation valve is disposed between the bucket wheel and the converter.

7. The system as claimed in claim 4, characterized in that the reservoir container is detachably connected with the dosing device.

8. The system as claimed in claim 7, characterized in that the reservoir container is an exchangeable container having an opening to be connected to the dosing device and a closure adapted to close the container when the container is disconnected from the dosing device and adapted to be opened after connecting the container to the dosing device.

9. The system as claimed in claim 2, characterized in that an air feeding device is connected to the feed line for blowing air into the feed line in the direction of $NH_3$ flow.

10. The system as claimed in claim 9, characterized in that the air feeding device has two air conduits and respective valves disposed in the two air conduits, one of the air conduits terminating in the feed line between the dosing device and exhaust gas line and the other of the air conduits terminating in the feed line between the converter and the dosing device.

11. Exhaust gas purification system for denoxing exhaust gases of a combustion unit on an SCR catalyst comprising a heatable pressure-tight converter containing a substance or a corresponding substance mixture thermolytically separating $NH_3$, an $NH_3$ store for the intermediate storage of $NH_3$ thermolytically separated from the substance or the substance mixture, a feed line connecting the converter with an exhaust gas line for supplying the $NH_3$ into an exhaust gas flow therein and a dosing device integrated into the feed line for dosing the quantity of $NH_3$ to be introduced into the exhaust gas flow, characterized in that an air feeding device is connected to the feed line for blowing air into the feed line, the air feeding device having two air conduits and respective valves disposed in the two air conduits, one of the air conduits terminating in the feed line between the dosing device and exhaust gas line and the other of the air conduits terminating in the feed line between the converter and the dosing device.

12. The system as claimed in claim 11, characterized in that a mixing chamber is integrated into the feed line between the dosing device and exhaust gas line and the one air conduit terminates in the mixing chamber.

13. The system as claimed in claim 11, characterized in that the valve disposed in the second air conduit is a check valve, and a heating device is associated with a section of the feed line between the converter and the termination of the first air conduit.

14. Exhaust gas purification system for denoxing exhaust gases of a combustion unit on an SCR catalyst comprising a heatable pressure-tight converter containing a substance or a corresponding substance mixture thermolytically separating $NH_3$, an $NH_3$ store for the intermediate storage of $NH_3$ thermolytically separated from the substance or the substance mixture, a feed line connecting the converter with an exhaust gas line for supplying the $NH_3$ into an exhaust gas flow therein, and a dosing device integrated into the feed line for dosing the quantity of $NH_3$ to be introduced into the exhaust gas flow, characterized in that units disposed in the feed line are combined into a constructional unit equipped with a resistance heating mechanism and ports which can be connected to cooling water circulation of a combustion engine.

15. Exhaust gas purification system for denoxing exhaust gases of a combustion unit on an SCR catalyst comprising a heatable pressure-tight converter containing a quantity of ammonium carbamate for thermolytically separating $NH_3$, an $NH_3$ store for the intermediate storage of $NH_3$ thermolytically separated from the ammonium carbamate, a feed line connecting the converter with an exhaust gas line for supplying the $NH_3$ into an exhaust gas flow therein, and a dosing device integrated into the feed line for dosing the quantity of $NH_3$ to be introduced into the exhaust gas flow, characterized in that two filling conduits terminate in the converter for filling the converter after consumption of the ammonium carbamate quantity in the converter, one of the filling conduits being connectable to one reservoir tank for supplying $NH_3$ from the one reservoir tank to the converter and the other of the filling conduits being connectable to another reservoir tank for supplying $CO_2$ from the other reservoir tank to the converter, the converter being connected to a source of cooling water circulation for cooling the same.

16. The system as claimed in claim 15, characterized in that means is contained in the converter for increasing the surface thereof.

17. The system as claimed in claim 15, characterized in that a second converter is provided with the first converter such that the two converters are alternately heatable as a duplex system.

* * * * *